(12) United States Patent
Pricone

(10) Patent No.: US 7,708,544 B2
(45) Date of Patent: May 4, 2010

(54) APPARATUS AND METHOD FOR MANUFACTURING MICRONEEDLES

(75) Inventor: Robert M. Pricone, Libertyville, IL (US)

(73) Assignee: 10x Technology LLC, Libertyville, IL (US)

( * ) Notice: Subject to any disclaimer, the term of this patent is extended or adjusted under 35 U.S.C. 154(b) by 438 days.

(21) Appl. No.: 10/565,356

(22) PCT Filed: Jul. 21, 2004

(86) PCT No.: PCT/US2004/023806

§ 371 (c)(1),
(2), (4) Date: Dec. 4, 2007

(87) PCT Pub. No.: WO2005/009645

PCT Pub. Date: Feb. 3, 2005

(65) Prior Publication Data

US 2008/0099963 A1    May 1, 2008

Related U.S. Application Data

(60) Provisional application No. 60/488,905, filed on Jul. 21, 2003.

(51) Int. Cl.
*B29C 33/10* (2006.01)
(52) U.S. Cl. .............. 425/387.1; 425/405.1; 425/504; 425/817 R

(58) Field of Classification Search ............. 425/387.1, 425/405.1, 503, 504, 812, 817 R, 817 C; 264/570, 154, 155, 156
See application file for complete search history.

(56) References Cited

U.S. PATENT DOCUMENTS

| 4,252,516 | A | * | 2/1981 | Raley et al. ................. 425/290 |
| 4,741,877 | A | * | 5/1988 | Mullane, Jr. ................ 264/504 |
| 4,873,048 | A | * | 10/1989 | Jarvenkyla .................. 264/504 |
| 5,073,237 | A | * | 12/1991 | Bacher et al. ............... 264/320 |
| 5,238,644 | A | | 8/1993 | Boulanger et al. |
| 5,252,279 | A | * | 10/1993 | Gore et al. .................. 264/154 |

(Continued)

*Primary Examiner*—Yogendra Gupta
*Assistant Examiner*—Emmanuel S Luk
(74) *Attorney, Agent, or Firm*—McDonnell Boehnen Hulbert & Berghoff LLP

(57) ABSTRACT

The apparatus comprises a mold assembly including at least one bore therethrough having a cavity therein defining the shape of the finished microneedle shape to be formed therein. The bore has an inlet opening and an exit opening. The apparatus also comprises means for locating the polymer to be formed at one end of the cavity and means for introducing fluid into the inlet opening of said bore and into the cavity. The apparatus also comprises exhaust means communicating with the exit opening of the bore, so that introducing the fluid through the polymer causes the polymer to assume the shape of the cavity and the fluid forms a hollow channel to define a needle-like structure in the polymer as the fluid is exhausted through the cavity and the bore.

15 Claims, 10 Drawing Sheets

U.S. PATENT DOCUMENTS

| | | |
|---|---|---|
| 5,383,512 A * | 1/1995 | Jarvis .......................... 164/46 |
| 5,447,679 A * | 9/1995 | Eigen et al. ................. 264/544 |
| 5,531,582 A | 7/1996 | Klinkhammer |
| 5,543,108 A * | 8/1996 | Bacher et al. ............... 264/553 |
| 5,945,196 A * | 8/1999 | Rieker et al. ................ 428/131 |
| 6,251,331 B1 | 6/2001 | Ampulski et al. |
| 6,312,612 B1 | 11/2001 | Sherman et al. |
| 6,379,324 B1 | 4/2002 | Gartstein et al. |
| 6,451,240 B1 * | 9/2002 | Sherman et al. ............. 264/504 |
| 6,790,372 B2 | 9/2004 | Roy et al. |
| 2003/0080475 A1 * | 5/2003 | Bosler et al. ................ 264/571 |
| 2005/0173845 A1 * | 8/2005 | Huang ........................ 264/544 |

* cited by examiner

APPARATUS AND METHOD FOR MANUFACTURING MICRONEEDLES

This application is a U.S. National Phase of International Patent Application Ser. No. PCT/US2004/023806, filed Jul. 21, 2004 which claims priority to U.S. Patent Application Ser. No. 60/488,905 filed Jul. 21, 2003.

BRIEF DESCRIPTION OF THE INVENTION

Apparatus and methods are disclosed for manufacturing a microneedle array consisting of spaced-apart microneedles integral with and extending above a base sheet. A channel is formed extending from the tip of the microneedle through the base allowing fluids to pass completely through the microneedles in the array.

Prior art patents document the uses to which such microneedles are intended to be put and demonstrate known efforts to manufacture microneedles. In particular, U.S. Pat. Nos. 6,471,903, 6,451,240, 6,379,324, 6,312,612 and 6,256,533, all assigned to the Procter & Gamble Company describe in great detail the characteristics and uses of such microneedle arrays. To date, the manufacturing processes detailed in these references have proven less than satisfactory on a commercial scale.

Preferably, the microneedle array is made from a polymer with flow characteristics that will take on the shape of the mold form and allow channels to be formed through the needles. Polymers such as urethanes, polysulfone, nylon, polycarbonates, acrylic and formulated radiation curable products may be used. The polymer may be applied in liquid form at a thickness of about 125 to 250 microns (0.005 to 0.010 inches thick) and may be heat cured, or room temperature cured, ultraviolet cured or cured by other radiation wavelengths. An alternative method is to apply the polymer as a film sheet then heat the polymer to a liquid state and cool back to a solid state once it has been formed with the gas channels.

One array of microneedles known to be of interest is formed with a height of about 160 microns (0.0064 inches), a base diameter of about 50 microns (0.002 inches), and spaced with adjacent microneedles being about 300 microns (0.012 inches) apart. Preferably the center channel is formed as a through hole, tapered or constant diameter depending on the application required.

In the present invention, a mold assembly is separable into upper and lower manifolds. The lower manifold has a gas inlet communicating with an internal cavity and has a top surface with one or more ports communicating with the internal cavity. A gasket material is placed on the top surface of the manifold having apertures generally in register with the top surface ports. A gas-permeable sheet or membrane is placed on top of the gasket and, in a first embodiment of the invention, a layer of polymer is applied to the membrane above the ports.

The upper manifold is sized, shaped and adapted to be fluid tight attachable to the lower manifold and has an upper internal bore communicating at one end with the upper ports and at the other end with an exhaust gas port. A micro-structure mold form is positioned above the polymer layer. The mold form has cavities in the shape of the microneedles formed precisely thereon, preferably as a series of generally frustoconical sections. Each cavity has a hole formed centrally such that a gas-tight path is formed from the lower manifold through the mold form and into the upper manifold. The microneedle mold form may be of metallic or polymeric construction depending on the temperature requirements to cure the polymer to be formed into microneedles.

In use, after the liquid polymer to be formed has been applied between the gas permeable membrane and the mold form, the upper manifold is attached to the lower manifold and gas under pressure is directed through the lower manifold inlet to pressurize the polymer and force it into the mold form. It has been found that if the gas pressure is maintained before the polymer in the mold form cures, the gas forces its way through the polymer and through the mold form holes, thereby forming channels which extend through the molded microneedles, from the base through the tip of each section, exiting through the top opening of the mold form.

Depending on the viscosity of the polymer to be formed, the gas pressure may range from less than 1 kilopascal per square centimeter (1 pound per square inch) to as much as 15-20 kilopascals per square centimeter (15-20 pounds per square inch). In some case it may be possible to use ambient air which has been filtered and dehumidified as the process gas. If UV or other radiation curable polymers are used it is anticipated that the use of inert gas may be of some advantage.

In another variation of the invention a thermoplastic film is substituted for the liquid polymer. The film is liquefied by heat, and then allowed to cool and solidify again after taking on the shape of the mold form and having channels formed through the microneedles.

Yet another variation of the invention substitutes a polymer powder for the liquid polymer. The powder is liquified by heat, then cooled and solidified after taking of the shape of the mold form and having channels formed through the microneedles.

Another embodiment uses a combination of gas pressure at the inlet of the manifold and vacuum pressure at the outlet side to draw gas through the polymer forming the channels.

When a UV-curable polymer is used, the upper manifold can be formed with transparent or translucent sections to allow such polymers to be exposed to ultraviolet light or other wavelengths while still in the mold form. After the polymer has set and has cured, the manifold halves are separated and the cured polymer sheet, with the molded microneedles, is removed.

In another embodiment of the present invention, a support sheet is formed from a rigid material such as sintered brass, porous Teflon or other porous materials allowing the gas to pass from the lower manifold to the gas permeable membrane while supporting the mold and polymer substrate.

In yet another embodiment, a second membrane is disposed in the upper manifold to absorb and collect excess polymer that may be extruded through the mold holes during the manufacturing process.

While the following describes a preferred embodiment or embodiments of the present invention, it is to be understood that this description is made by way of example only and is not intended to limit the scope of the present invention. It is expected that alterations and further modifications, as well as other and further applications of the principles of the present invention will occur to others skilled in the art to which the invention relates and, while differing from the foregoing, remain within the spirit and scope of the invention as herein described. For the purposes of the present disclosure, two structures that perform the same function within an environment described above may be equivalent structures.

BRIEF DESCRIPTION OF THE DRAWINGS

These and further objects of the present invention will become apparent upon consideration of the drawings in which.

DETAILED DESCRIPTION OF THE INVENTION

Figure 1:
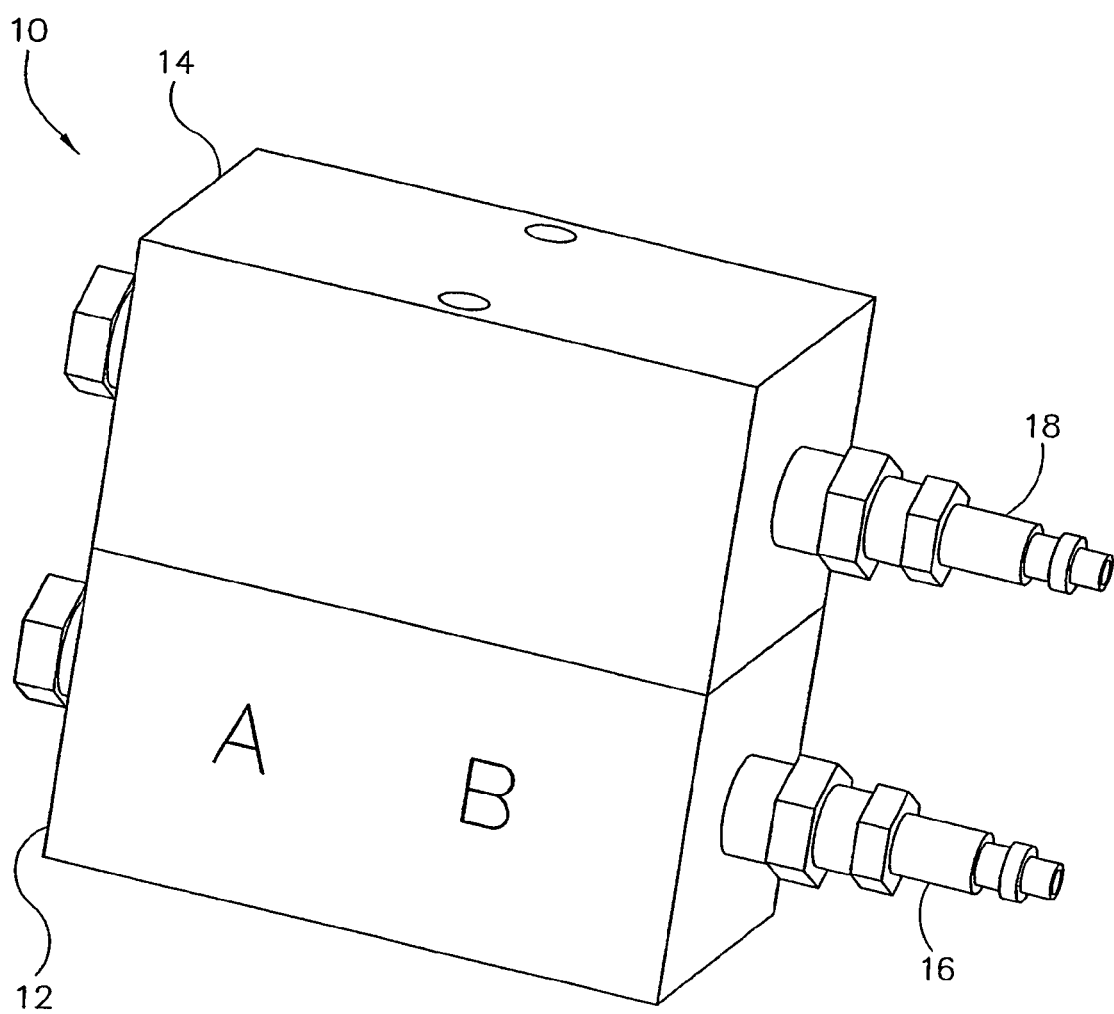
FIG. 1 is a perspective view of an apparatus for the manufacture of microneedle arrays showing the upper and lower manifold attached one to the other.

Referring now to FIG. 1, the numeral 10 indicates generally a mold assembly having a lower manifold 12 and an upper manifold 14. Attached fluid tightly to lower manifold 12 is a gas inlet coupling 16 and in like fashion, a gas outlet coupling 18 is attached fluid tightly to upper manifold 14.

Figure 2:
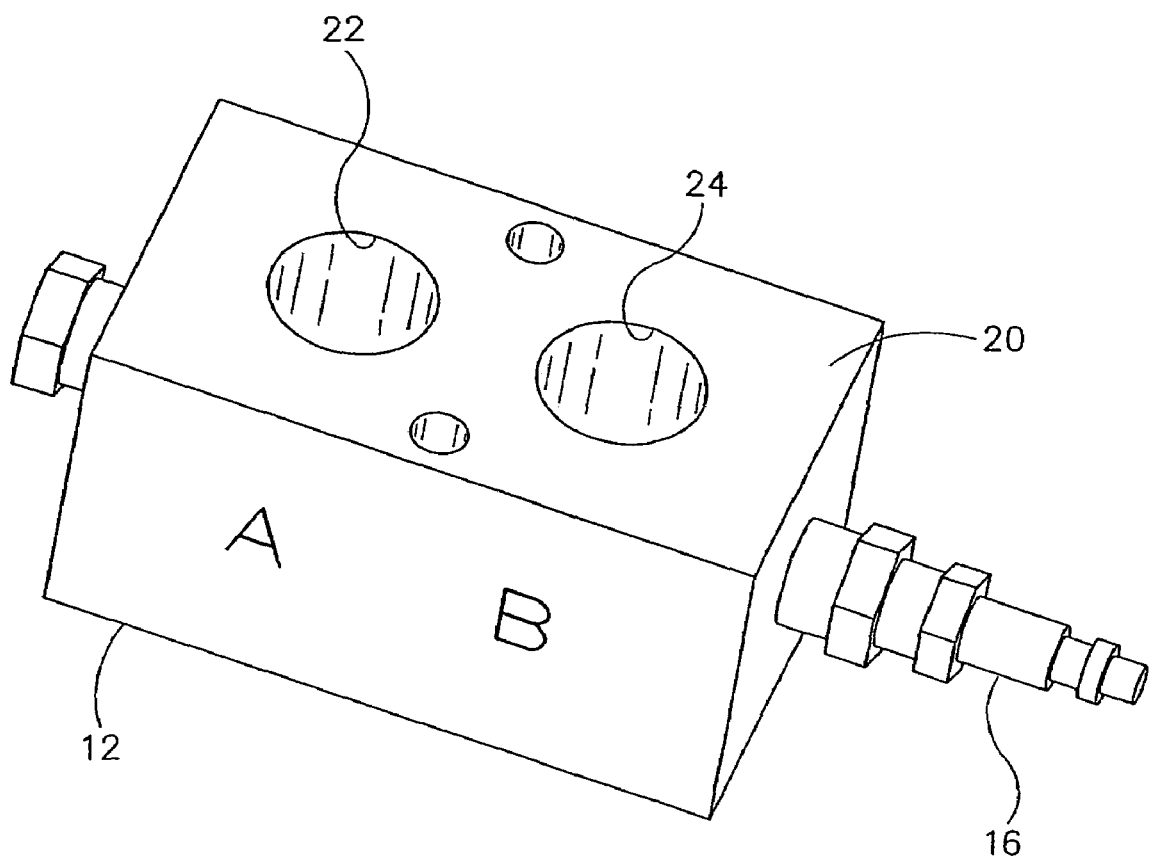
FIG. 2 is a perspective view of the lower manifold separated from the upper manifold.

Referring now to FIG. 2, lower manifold 12 is seen separated from upper manifold 14. Lower manifold 12 has a top surface 20 through which a pair of gas ports 22, 24 are drilled communicating with an inner, hollow inlet bore 26 shown schematically in FIG. 8. Bore 26 extends to communicate with a gas inlet 28 to which coupling 16 is attached.

Figure 3:
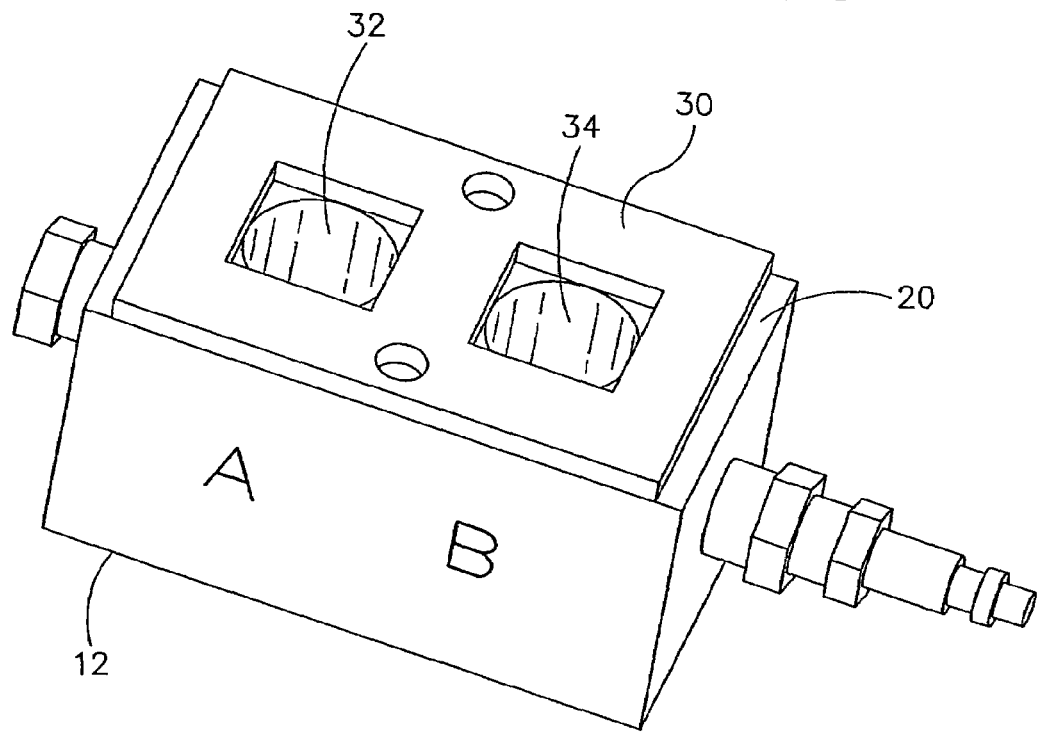
FIG. 3 is a perspective view of the lower manifold with the gasket in place.

Referring now to FIG. 3, a gasket material 30 is placed on top surface 20 of lower manifold 12. In the embodiment shown in FIG. 3, pad 30 is formed from silicone rubber and has pad openings 32, 34 sized and positioned to align with ports 22 and 24.

Figure 4:
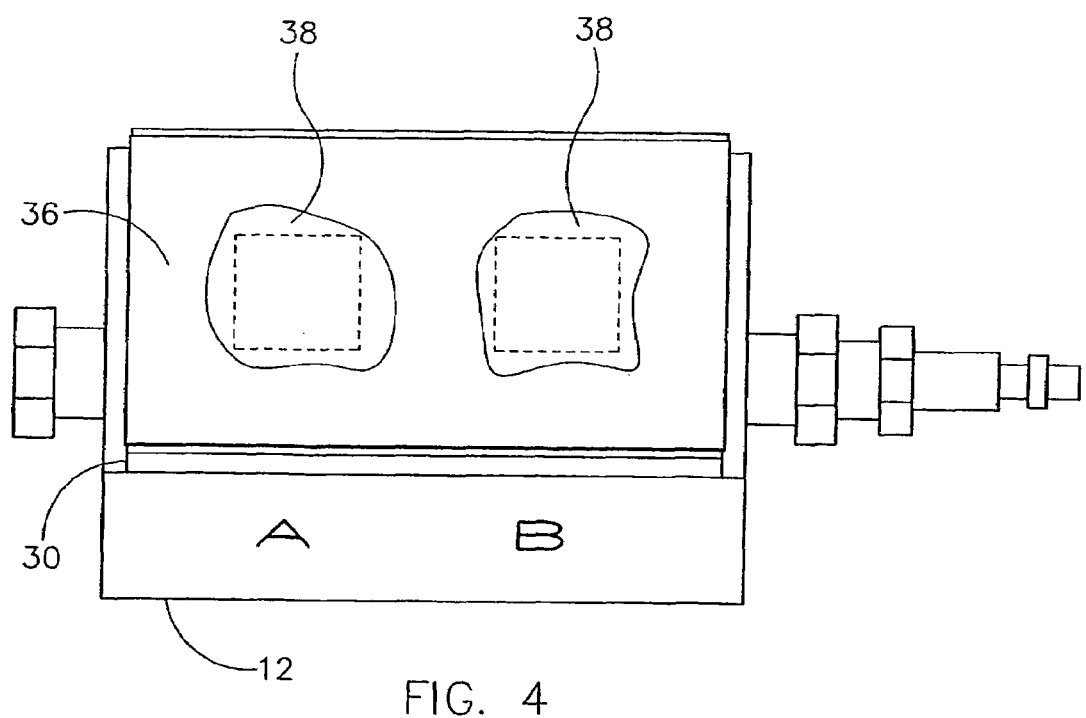
FIG. 4 is a perspective view of the lower manifold showing a gas permeable membrane placed on the gasket and a layer of polymer placed on the membrane.

Referring to FIG. 4, a gas permeable membrane 36 is shown positioned on pad 30. Membrane 36 can be formed from a variety of gas permeable materials such as fabrics, meshes, sintered metals and the like. In a preferred embodiment of the present invention polyester fabric is used.

As further seen in FIG. 4, a selected quantity of polymer 38 is deposited on membrane 36 prior to the reassembly of mold 10. Polymer 38 can be selected from a number of known polymers such as urethane and can be supplied in forms as diverse as extruded films, powders, liquid solutions and UV ultraviolet curable solutions so long as these polymer variations retain flow characteristics which allow the polymer to fill the mold form to flow under pressure. Preferably these physical characteristics are present at room temperature and the selected polymer can thereafter be cured to retain its molded shape. Curing can be accomplished by elevated mold temperature, exposure to ultraviolet radiation, cooling of molten polymer or other commonly known process expedients.

Figure 5:
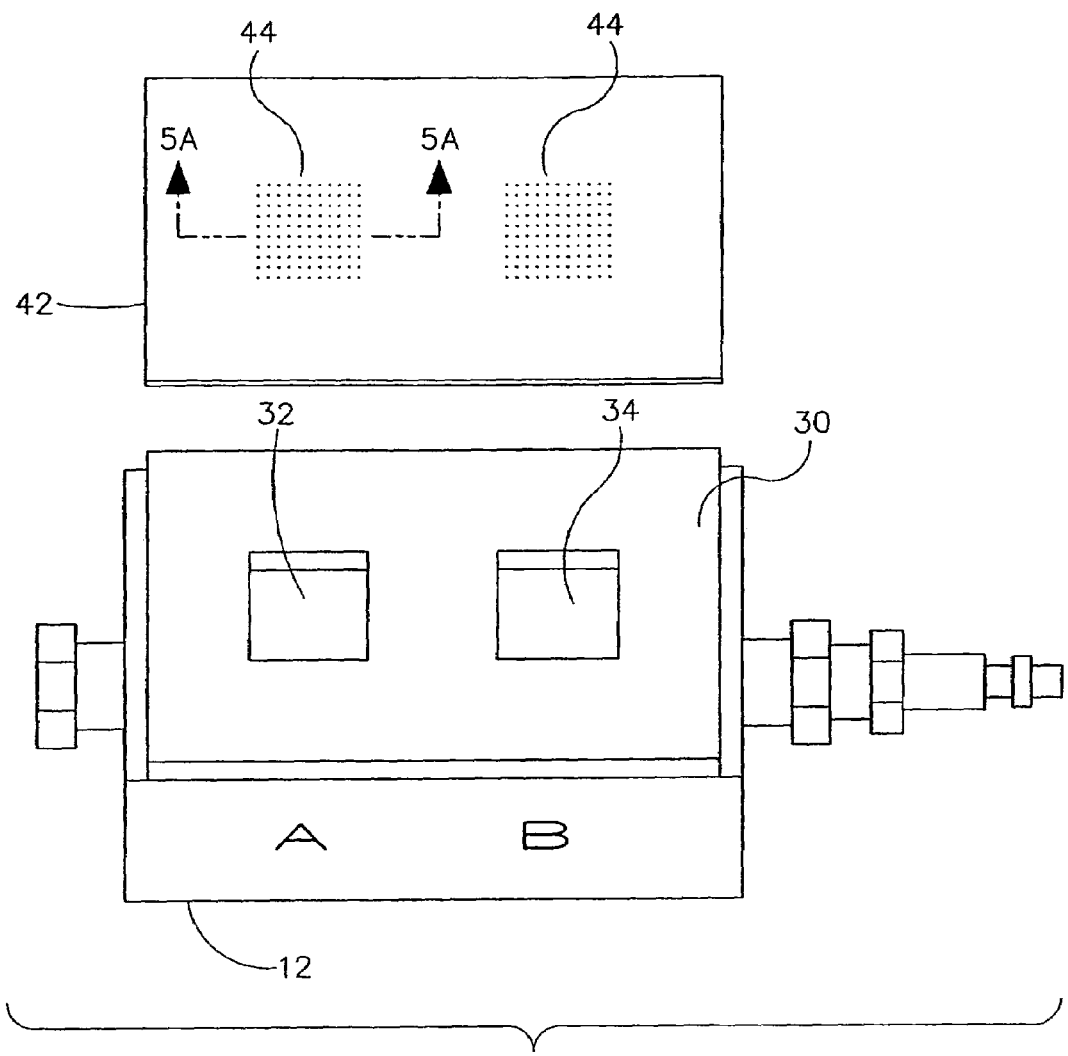
FIG. 5 is a perspective view of the mold form having the microneedle array pattern formed thereon seen next to the lower manifold.

Referring now to FIG. 5 a mold form 42 is shown next to lower manifold 12. Manifold 12 is shown as in FIG. 3, with support pad 30 and pad openings 32, 34 positioned thereon. In the embodiment herein described, mold form 42 has microneedle array patterns 44 formed therein, preferably over those portions of mold form 42 that register with openings 32, 24. In other embodiments, array 44 is molded as a repeating pattern covering the entire surface of mold form 42. Manufacture of the precision patterns required to successfully mold microneedles is represented in the prior art by U.S. Pat. Nos. 4,601,861, 4,478,769 and 4,486,363 all of which teach techniques for forming precision patterns in polymeric sheets.

Figure 5A:
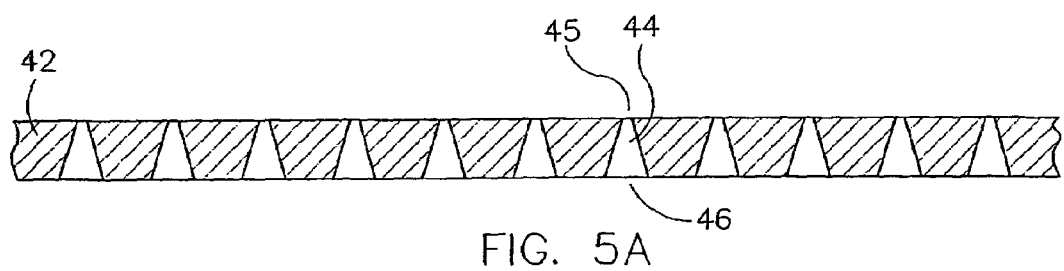
FIG. 5A is a magnified side view of the mold form.

Referring to FIG. 5A, there is shown a magnified side view of mold form 42 showing microneedle cavities 44 with openings at the top 45 and bottom 46.

Figure 6:
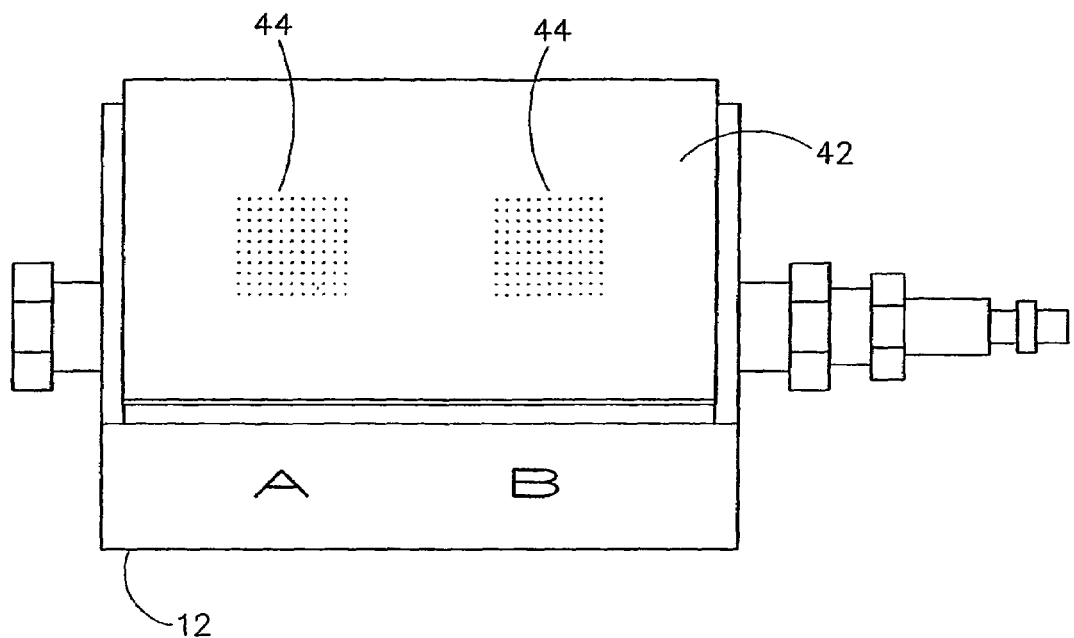
FIG. 6 is a perspective view of the mold form positioned upon the lower manifold.

Referring now to FIG. 6, mold form 42 is shown positioned on gasket or pad 30 with arrays 44 aligned with apertures 32, 34. As described above, apertures 32, 24 are aligned with ports 22, 24 respectively.

Figure 7:
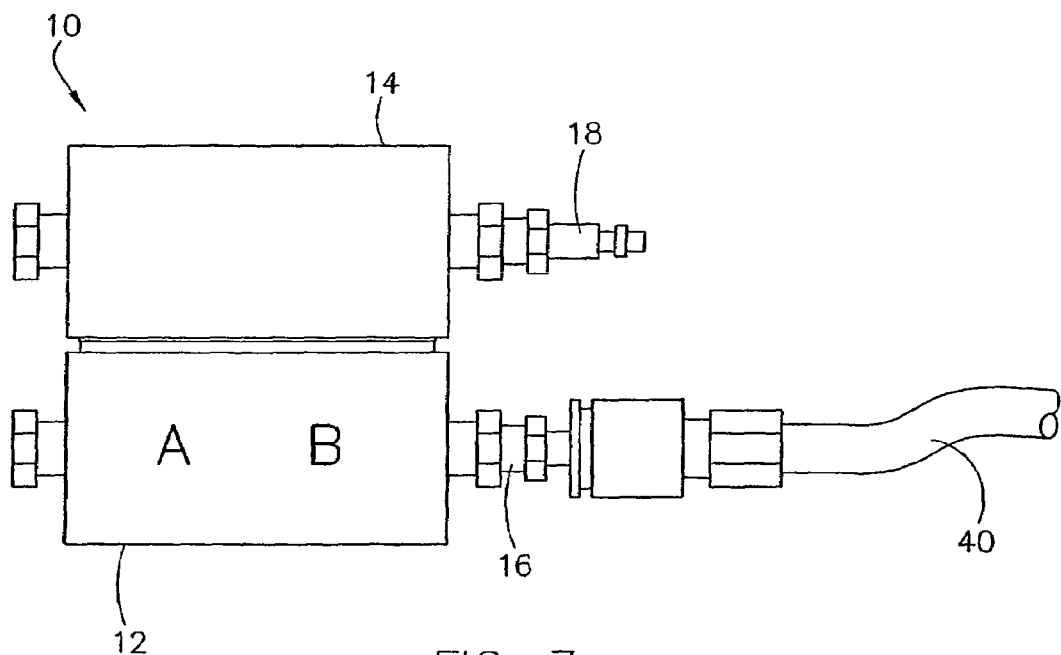
FIG. 7 is a perspective view of the upper and lower manifolds reassembled one to the other and with a gas supply line connected to the lower manifold.

Practice of the present invention may now be described by referring to FIGS. 7, 8 and 9. After polymer 38 is placed on membrane 36 and mold form 42 is positioned over membrane 36, mold 10 is reassembled as shown in FIG. 7 with upper manifold 14 reattached to lower manifold 12 and with gas supply line 40 attached to gas inlet coupling 16.

Figure 8:
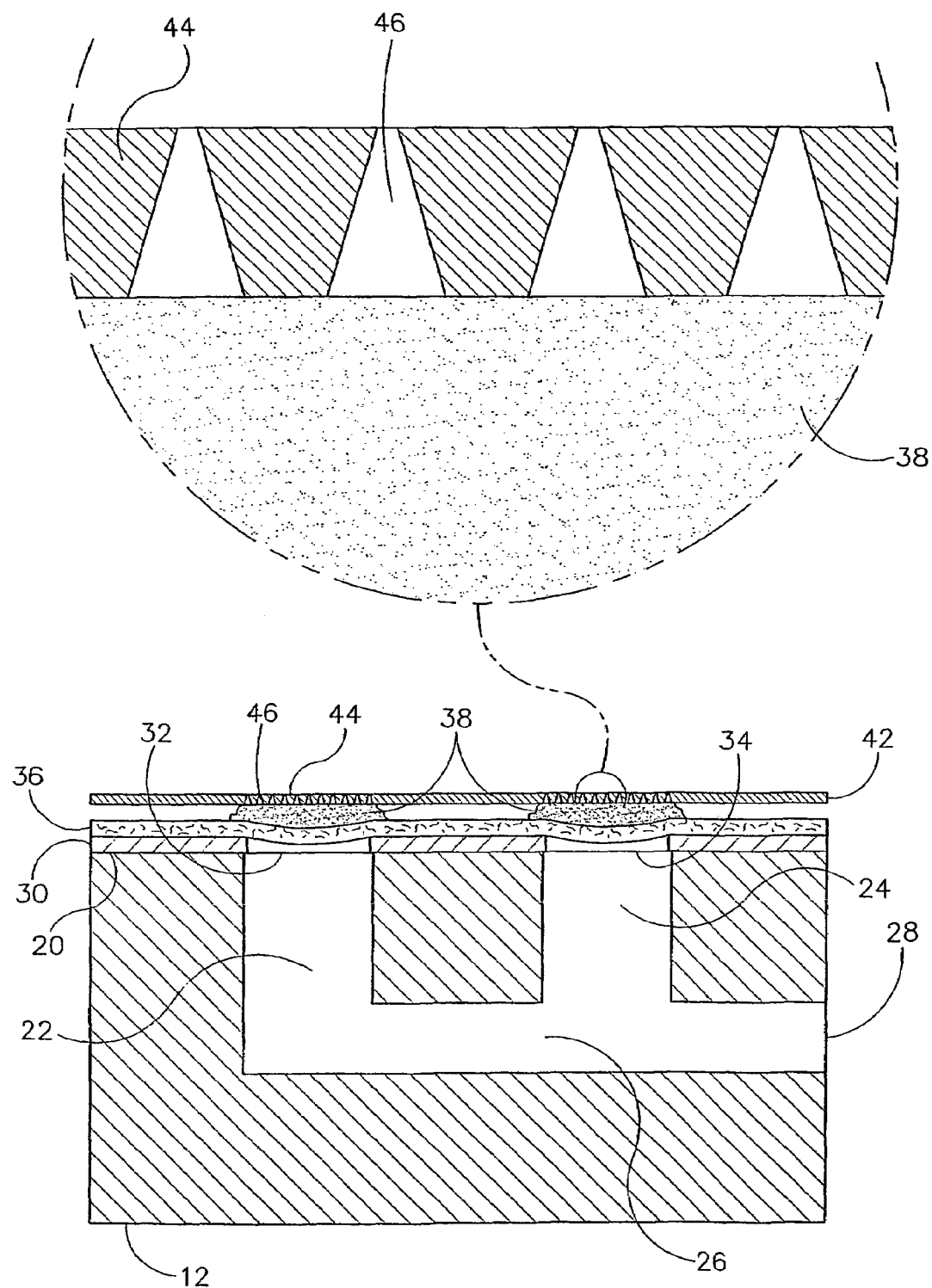
FIG. 8 is a sectional schematic view of the lower manifold with the gasket, membrane, polymer and mold form in place.

FIG. 8 is a schematic cross sectional view of lower manifold 12 of mold 10. Lower manifold 12 is shown with gasket pad 30 positioned upon top surface 20, with ports 22 and 24 aligned with gasket openings 32 and 34. Membrane 36 is positioned atop gasket pad 30 and polymer 38 has been deposited upon membrane 30 above aligned ports and openings 22, 32 and 24, 34 respectively. Mold form 42 with microneedle pattern arrays 44 is positioned above polymer 38.

In a preferred embodiment, the microneedle pattern array 44 comprises a series of spaced-apart frustoconical cavities 46 which, in the present invention, correspond to the size and shape of the microneedles to be formed.

Figure 9:
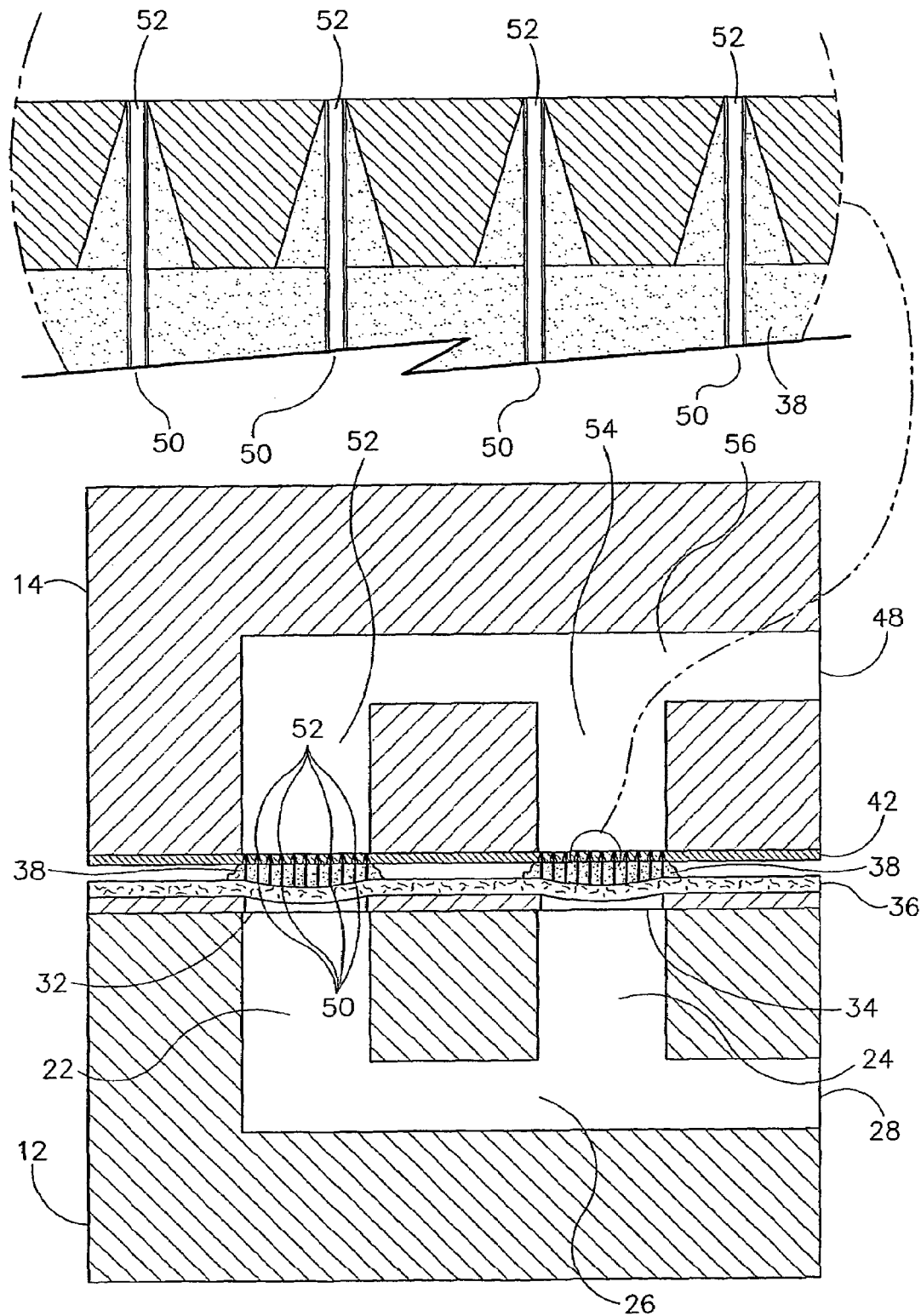
FIG. 9 is a sectional schematic view showing the upper and lower manifolds assembled together and the polymer in the mold form after the process has been carried out and the polymer is curing.

Referring now to FIG. 9, mold 10 is shown assembled and in schematic cross section. After mold 10 has been sealed, gas is introduced via gas line 40 to gas inlet 28, passing through bore 26 and forced under pressure through ports 22, 24 and pad openings 34, through membrane 36 into contact with polymer 38. Polymer 38, when introduced to mold 10 is in a flowable state and the gas forces polymer 38 into mold form 42, filling the microneedle cavities in array 44 and forming a series of channels 50 by displacing the polymer and exiting through mold form holes 52 into upper manifold ports 52, 54 and an upper mold bore 56, thereby, exiting mold 10 by gas outlet 48, to which gas outlet coupling 18 is attached. The gas flow is maintained until polymer 38 is cured, making channels 50 permanent.

Figure 10:
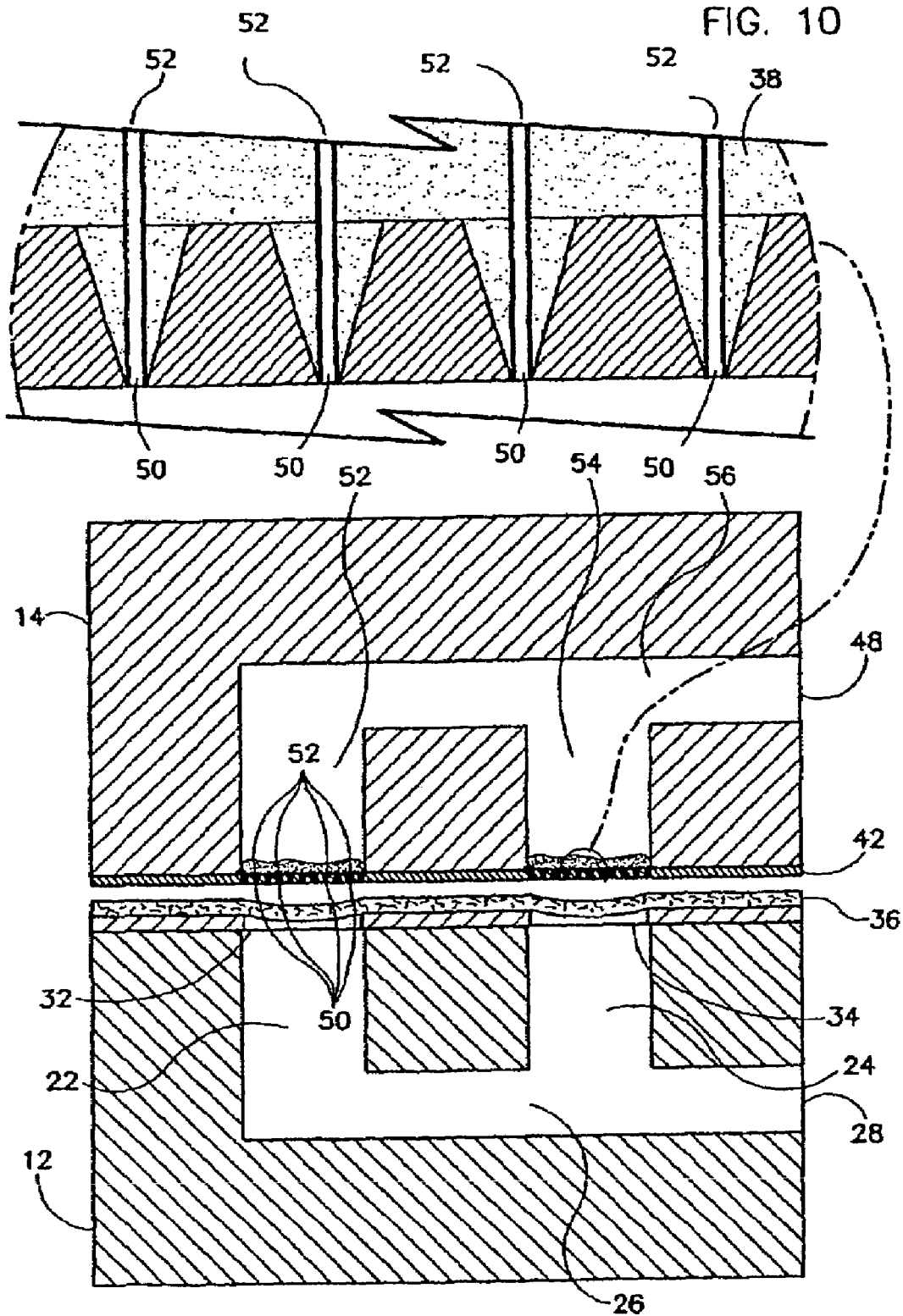
FIG. 10 is a sectional schematic view of an alternative method showing the upper and lower manifolds assembled together and the polymer in the mold form after the process has been carried out and the polymer is curing.

Referring now to FIG. 10, as an alternative method to the apparatus in FIG. 9, mold 10 is shown assembled and in schematic cross-section. After mold 10 has been sealed, gas is introduced via gas line 40 to gas inlet 28, passing through bore 26 and forced under pressure through ports 22, 24 and pad openings 34, through membrane 36. Polymer 38, when introduced to mold 10 is in a flowable state and occupies the cavities of the mold form 42. In this case the mold form 42 is inverted, so the larger opening appears at the top of the tapered cavity section, as illustrated in the enlarged view of FIG. 10. In this case it may not be necessary to utilize the upper manifold 14. The gas forces a series of channels 50 by displacing the polymer and exiting through holes 52 at the top of the polymer into upper manifold ports 52, 54 and an upper mold bore 56, thereby exiting mold 10 by gas outlet 48, to which gas outlet coupling 18 is attached. The gas flow is maintained until polymer 38 is cured, making channels 50 permanent. Mold 10 is then separated and the cured polymer 38 having an array of microneedles formed thereon is removed therefrom.

While the channels 50 appear to be uniform in size from top to bottom, in actual practice, dependent upon the viscosity of the polymer and the gas pressure, the channel may change in diameter to complement the mold shape.

Figure 11:
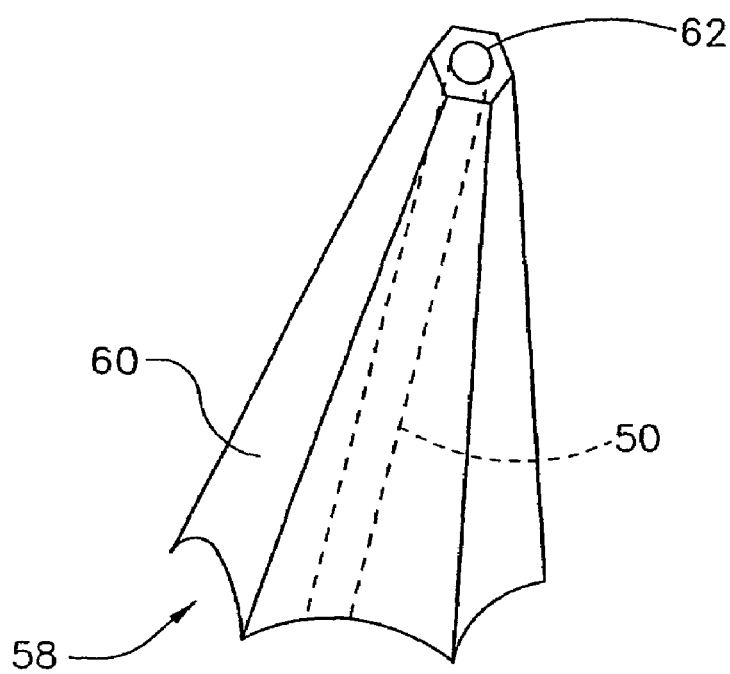
FIG. 11 is a partial perspective view of a single microneedle.

FIG. 11 is a single molded microneedle 58 from the array shown having side walls 60 and a central opening 62 which is the uppermost portion of channel 50. The wall thickness of microneedle 52 can be varied by varying the rate of flow of the gas through polymer 38 as well as by varying the viscosity of the polymer 38.

Figure 12:
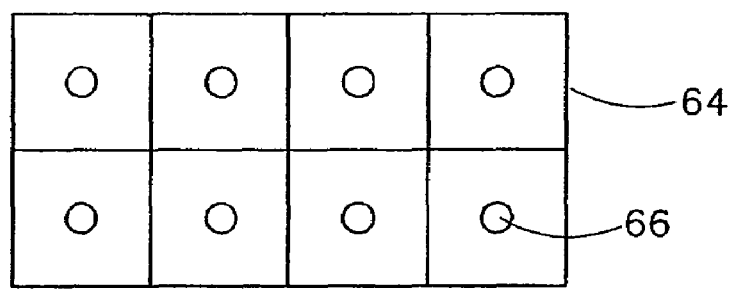
FIG. 12 is a top schematic view of a support pad formed with a regularly spaced array of through holes.

Referring to FIG. 12, numeral 64 includes a second preferred embodiment of a support pad formed as a rigid metallic strip having a series of holes 66 formed therethrough, the size and spacing of holes 66 is thought to make the process of forming microneedles 58 more efficient.

The gas used in the foregoing process may be filtered in dehumidified air at ambient temperature. Under some circumstances, using certain polymers, such as UV curable polymers it is thought that using an inert gas such as nitrogen will be more efficient.

Figure 13:
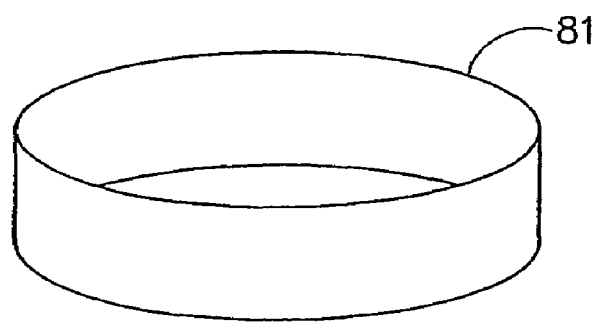
FIG. 13 is a schematic view of a cylindrical flexible mold form of multiple microneedle array patterns joined to form a continuous belt.

Referring to FIG. 13, numeral 81 is a cylindrical mold form comprised of microneedle array patterns joined together to form a continuous belt.

Figure 14:
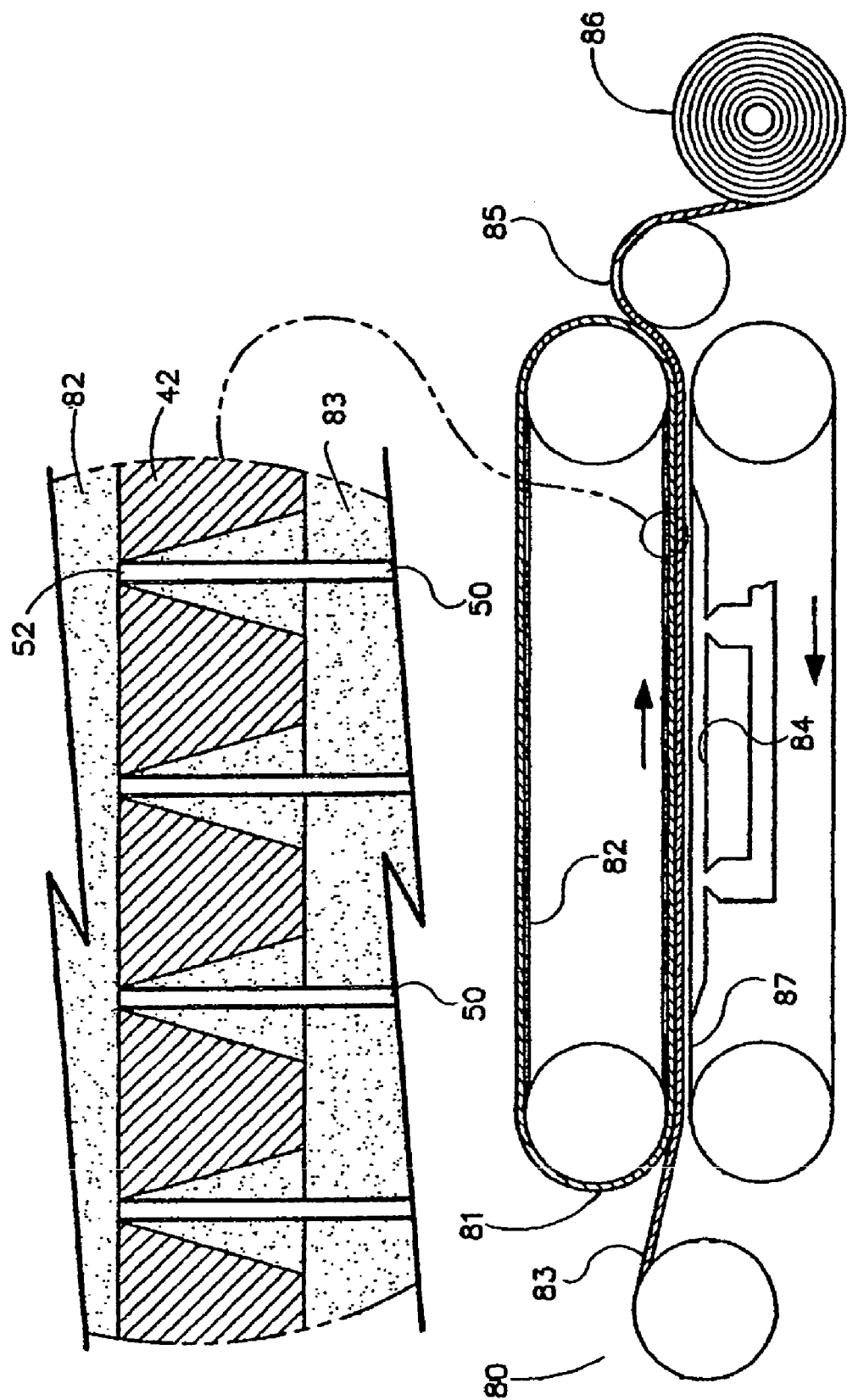
FIG. 14 is a schematic view of the apparatus using the cylindrical mold in FIG. 12 to continuously fabricate product.

Referring to FIG. 14, numeral 80 illustrates a form of apparatus which may be used to continuously fabricate microneedle products. The apparatus may comprise a variation of a double-belt press similar to that sold by Hymmen GmbH of Bielefeld, Germany, as models ISR and HPI, which are examples of continuous press, high-pressure processing machinery. By incorporating a generally cylindrical flexible mold 81 shown in FIG. 13 with a porous backing 82, polymer film 83 is introduced into the machine and melted to a fluid state by hot air plenum 84 beneath a lower porous belt 87. After fluidizing the polymer 83, the hot air from plenum 84 then forces air channels 50 through the polymer 83 which exits as a through channel 52 at the top side of the polymer. It further vents through the top porous mold backing 82. The gas flow is maintained until polymer 83 is cured, making channels 50 permanent.

Cured polymer 85 having an array of microneedles formed thereon is then separated from mold 81 and wound into rolls 86 with an interlayer of foam (not shown) to protect the microneedles. In a later operation the product is then cut into discrete sections.

In the foregoing description, it will be readily appreciated by those skilled in the art that modifications may be made to the inventions without departing from the concepts disclosed herein. Such modifications are to be considered as included in the following claims.

What is claimed is:

1. Apparatus for forming an array of microneedle structures in a polymer material, said apparatus comprising a mold assembly including at least one bore therethrough having a cavity therein defining the shape of the finished microneedle shape to be formed therein, said bore having an inlet opening and an exit opening; means for locating the polymer to be formed at one end of said cavity; means for introducing fluid into said inlet opening of said bore and into said cavity; and exhaust means for communicating with said exit opening of said bore, whereby introducing said fluid through said polymer causes said polymer to assume the shape of said cavity and said fluid forms a hollow channel to define a needle-like structure in said polymer as said fluid is exhausted through said cavity and said bore, and wherein said mold assembly includes upper and lower manifolds separated by a fluid-tight gasket disposed therebetween, and said mold forming cavity is in said upper manifold.

2. The apparatus set forth in claim 1, and further including a gas permeable membrane disposed between said gasket and said cavity with said polymer to be disposed above said gas permeable membrane.

3. The apparatus of claim 1, wherein said lower manifold has a gas inlet communicating with an internal cavity that feeds to said at least one bore.

4. The apparatus of claim 1, wherein the polymer is a UV-curable polymer and said upper manifold is formed with a transparent or translucent section to allow such polymer to be exposed to UV light while still in said mold cavity for curing said formed polymer.

5. The apparatus of claim 1, wherein said gas permeable membrane is formed of a polyester fabric.

6. The apparatus of claim 1, wherein said gasket is in the form of a rigid strip of material having openings therein aligned with said bore and said cavity.

7. The apparatus of claim 1, wherein said gasket is comprised of a silicone rubber.

8. The apparatus of claim 1, wherein said structure defining said microneedle-shaped cavity further comprises a mold form disposed between said upper and lower manifolds and above said gas permeable member.

9. An apparatus for forming an array of microneedle structures in a polymer material, said apparatus comprising a mold assembly having an upper manifold and lower manifold, each of said manifolds being adapted to be positioned in airtight relation relative to one another, the upper manifold having at least one cavity formed therein; at least one bore in said lower cavity feeding through to a bore in said cavity and through said upper manifold; an inlet port feeding said bore in said lower manifold; an exit port for exhausting said upper cavity via said bore in said upper manifold; a gas impervious gasket disposed between said upper and lower manifolds; a gas permeable membrane adapted to be positioned between said upper and lower manifolds.

10. The apparatus of claim 9, wherein said upper manifold includes a plurality of mold forming cavities therein, each of said mold forming cavities being configured to provide a microneedle-like structure therein, with the height of said needle being approximately 160 microns and having a base diameter of approximately 50 microns and the spacing of at least two of said microneedle assemblies being disposed approximately 300 microns from one another center-to-center.

11. The apparatus of claim 9, wherein the through hole or channel formed by said microneedle cavity is of a tapered configuration.

12. The apparatus of claim 11, wherein said gas permeable membrane is formed of a polyester fabric.

13. The apparatus of claim 11, wherein said gasket is in the form of a rigid strip of material having openings therein aligned with said bore and said cavity.

14. The apparatus of claim 11, wherein said gasket is comprised of a silicone rubber.

15. The apparatus of claim 11, wherein said structure defining said microneedle-shaped cavity further comprises a mold form disposed between said upper and lower manifolds and above said gas permeable member.

* * * * *